United States Patent
Namura

(10) Patent No.: US 6,649,699 B2
(45) Date of Patent: Nov. 18, 2003

(54) FLUOROPOLYMER COMPOSITIONS WITH IMPROVED GAS IMPERMEABILITY

(75) Inventor: Shinichi Namura, Shimizu (JP)

(73) Assignee: DuPont Mitsui Fluorochemicals, Tokyo (JP)

( * ) Notice: Subject to any disclaimer, the term of this patent is extended or adjusted under 35 U.S.C. 154(b) by 0 days.

(21) Appl. No.: 09/993,172

(22) Filed: Nov. 16, 2001

(65) Prior Publication Data

US 2002/0099143 A1 Jul. 25, 2002

(30) Foreign Application Priority Data

Nov. 30, 2000 (JP) ........................................ 2000-364571

(51) Int. Cl.⁷ ........................... C08L 27/12; C08L 27/18
(52) U.S. Cl. ...................................................... 525/199
(58) Field of Search .......................................... 525/199

(56) References Cited

U.S. PATENT DOCUMENTS

| 4,624,990 A | | 11/1986 | Lunk et al. |
| 5,317,061 A | * | 5/1994 | Chu et al. .................... 525/200 |
| 5,473,018 A | | 12/1995 | Namura et al. |
| 5,603,999 A | | 2/1997 | Namura et al. |
| 5,688,307 A | | 11/1997 | Pinnau et al. |

FOREIGN PATENT DOCUMENTS

JP          9316266         9/1997

* cited by examiner

*Primary Examiner*—Nathan M. Nutter

(57) ABSTRACT

A composition of tetrafluoroethylene/perfluoro(alkyl vinyl ether) having at least 4 wt % perfluoro(alkyl vinyl ether) and a melt flow rate of no greater than 4 g/10 min, and 5 to 30 wt % low molecular weight PTFE, has improved gas impermeability and also mechanical strength.

9 Claims, No Drawings

FLUOROPOLYMER COMPOSITIONS WITH IMPROVED GAS IMPERMEABILITY

FIELD OF THE INVENTION

The present invention relates to a blend composition of melt-processible tetrafluoroethylene/perfluoro(alkyl vinyl ether) copolymer with polytetrafluoroethylene having superior resistance to gas permeability and mechanical durability.

BACKGROUND OF THE INVENTION

Melt-processible polymers comprising tetrafluoroethylene and perfluoro(alkyl vinyl ether), commonly known as PFA, have excellent heat resistance and inertness, i.e. chemical stability, making this copolymer highly useful in the form of melt-fabricated articles such as vessels and tubes for handling and transporting liquid chemicals or ultra-pure water used in semiconductor manufacture. U.S. Pat. No. 5,473,018 discloses the addition of low molecular weight polytetrafluorethylene (PTFE) to PFA to increase the surface smoothness of the melt-fabricated articles so as to minimize adhesion of the liquids handled by the molded PFA articles to avoid contamination of the semiconductor manufacturing process.

Articles melt-fabricated from PFA and used for handling of liquids also need to be gas impermeable and durable so as to withstand the repeated flexing encountered in use. While the problem of improved surface smoothness is solved by the invention disclosed in U.S. Pat. No. 5,473,018, information is not provided therein on gas permeability. In addition, the effect of the adding the low molecular weight PTFE to PFA as disclosed in the '018 patent is generally to decrease the flexibility of the resultant PFA composition, as characterized by decreased folding endurance. In Example 7, low molecular weight PTFE contents of 5 wt % and above decrease the folding endurance as compared to the article made entirely from PFA (Table 3). In Tables 4 and 5, the reduction in folding endurance occurs at even lower contents of low molecular weight PTFE.

The problem arises as to how to increase the folding endurance of PFA and how to increase the gas impermeability of the PFA as well.

SUMMARY OF THE INVENTION

It has been discovered that addition of at least about 5 wt % low molecular weight polytetrafluoroethylene (PTFE) to PFA increases the gas impermeability of the PFA and articles melt-fabricated therefrom. In accordance with the Examples in the '018 patent, however, this amount of low molecular weight PTFE additive to the PFA has an adverse affect on folding endurance. It has further been discovered that certain PFA/low molecular weight PTFE compositions provide both improved gas impermeability and increased folding endurance.

Thus the present invention is a composition comprising a copolymer of tetrafluoroethylene and perfluoro(alkyl vinyl ether) (PFA) and about 5 to about 30 wt % of low molecular weight PTFE, based on the combined weight of the PFA and low molecular weight PTFE, wherein the low molecular weight of the PTFE is characterized by a heat of crystallization of at least about 50 J/g and wherein the perfluoro(alkyl vinyl ether) content of the PFA is at least about 4 wt %, based on the total weight of the copolymer, and the PFA has a melt flow rate (MFR) of no more than about 4 g/10 min.

When the low molecular weight PTFE content is less than 5 wt % and/or the comonomer content is less than about 4 wt % and/or the MFR of the PFA is greater than about 4 g/10 min, the combination of improved gas impermeability and increased folding endurance is not obtained. It is especially surprising that the increased amount of low molecular weight PTFE as compared to the amounts used in the '018 patent, which did adversely affect folding endurance, improves folding endurance in the present invention.

DETAILED DESCRIPTION

In the present invention, a tetrafluoroethylene/perfluoro (alkyl vinyl ether) copolymer is used. General formulas for the perfluoro(alkyl vinyl ether) are given in (1) and (2).

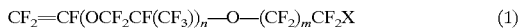

$$CF_2=CF(OCF_2CF(CF_3))_n-O-(CF_2)_mCF_2X \qquad (1)$$

X is H or F; n is an integer of 0 to 4; m is an integer of 0 to 7.

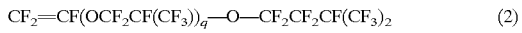

$$CF_2=CF(OCF_2CF(CF_3))_q-O-CF_2CF_2CF(CF_3)_2 \qquad (2)$$

q is an integer of 0 to 3.

Perfluoro(propyl vinyl ether) (PPVE) and perfluoro(ethyl vinyl ether) (PEVE) are preferred perfluoro(alkyl vinyl ethers). Especially a copolymer with perfluoro(ethyl vinyl ether) exhibits a great improvement effect on mechanical durability by the addition of low molecular weight PTFE, which is described later; hence it is most preferable.

In the present invention, the perfluoro(alkyl vinyl ether) content of the copolymer is from about 4 wt % or greater, preferably about 5 to about 20 wt %. When the content is less than 4 wt %, mechanical durability is unsatisfactory, whereas when it is greater than about 20 wt % the service temperature of articles made from the polymer blend is too low. Furthermore, the copolymer of the present invention has a melt flow rate (MFR) of about 0.1 to about 4 g/10 min, preferably about 0.5 to about 3 g/10 min at 372±1° C. If the MFR exceeds about 4 g/10 min, the blend with low molecular weight PTFE tends to have reduced mechanical durability. When the MFR is below about 0.1 g/10 min melt-processing becomes difficult.

In the present invention, the low molecular weight PTFE added to the above-mentioned copolymer is a tetrafluoroethylene homopolymer or a modified PTFE containing a very small amount, 1 wt % or less, of a comonomer, for example, hexafluoropropylene, perfluoro(alkyl vinyl ether), fluoroalkylethylene or chlorotrifluoroethylene. The low molecular weight of the low molecular weight PTFE is characterized by high crystallinity with a heat of crystallization of about 50 J/g or greater. A typical range of heat of crystallization is from about 50 to about 90 J/g. The low molecular weight PTFE can be made directly from the polymerization of tetrafluoroethylene in the presence of a chain transfer agent. It can also be made by irradiating or by pyrolyzing high molecular weight PTFE of the kind known as "molding powder" (also known as "granular") or "fine powder", or its moldings made therefrom. The low molecular weight PTFE made by irradiation is preferred. The term "low molecular weight" as it applied to PTFE is used in contrast to the very high molecular weights of molding powder or fine powder, which are characterized by a much lower heat of crystallization, e.g. less than about 35 J/g. The heat of crystallization is generally used to characterize the low molecular weight PTFE (sometimes referred to as micropowders, as in ASTM D 5675).

PTFE having a heat of crystallization of less than about 50 J/g, for example, PTFE "molding powder" or "fine powder", is not a satisfactory component of the blend compositions of this invention because it confers unacceptably high viscosity on the blends, which make melt processing difficult.

The optimum amount of low molecular weight PTFE in the composition of the present invention varies depending on the perfluoro(alkyl vinyl ether) content the copolymers. However, it is in the range of about 5 to about 30 wt %. If the content is less than about 5 wt %, a significant improvement in gas permeability resistance is not realized, whereas if it is greater than about 30 wt % mechanical durability is reduced.

In the present invention, there is no restriction on the process for mixing low molecular weight PTFE with the copolymer. Melt-blending, dry blending, and wet blending can be utilized. Also, the low molecular weight PTFE particles can be dispersed in the polymerization kettle in advance in the polymerization to make the PFA copolymer. It is also possible to first polymerize low molecular weight PTFE in the polymerization kettle and thereafter to add tetrafluoroethylene and perfluoro(alkyl vinyl ether) to make the PFA. Since the low molecular weight PTFE used in the present invention is compatible with PFA in the molten state, it disperses readily in the copolymer during melt-blending or melt-extrusion, giving a uniform composition that exhibits the improved properties of the present invention. Therefore there is no restriction on the particle size of low molecular weight PTFE to be mixed, but usually fine particles of 0.05 to 1 μm in average particle size or a powder of several micrometers to several tens of micrometers is used. A typical range is about 0.01 to about 100 μm, preferably about 0.05 to about 50 μm, more preferably about 0.05 to about 25 μm.

EXAMPLES

Examples of the present invention and comparative examples are disclosed in the following. Properties are determined according to these methods:

Comonomer content: a 50 μm thick film sample is press-molded at 350° C. Its IR spectrum in a nitrogen atmosphere is measured. Depending upon the identity of the comonomer, the ratio of the absorbance at 9.17 μm (for PEVE), or the absorbance at 10.07 μm (for PPVE) to the absorbance at 4.25 μm is measured, and compared with a calibration curve obtained with standard samples of known PEVE or PPVE content.

Melt flow rate (MFR): The procedure of ASTM D1238-95 is used. The melt indexer is made by Toyo Seiki. 5 g of polymer is charged to the cylinder and held at 372±1° C. for 5 min, after which it is extruded through the die orifice under a 5 kg load (piston and weight), the extrusion rate (g/10 min) being reported as the MFR.

Melting Peak Temperature, Crystallization Peak Temperature, and Heat of Crystallization: A Perkin Elmer Co. differential scanning calorimeter DSC 7 is used. A 10 mg sample is weighed and placed in an aluminum pan, which is then crimped. The pan is placed in the DSC and the temperature is increased from 150° C. to 360° C. at the rate of 10° C./min. The sample is held at 360° C. for 1 minute and then the temperature is decreased to 150° C. at a rate of 10° C./min. Crystallization temperature (Tc) and heat of crystallization (Hc) are obtained from the crystallization curve. In the next step, the sample is held at 150° C. for 1 min. and the temperature is increased to 360° C. at a rate of 10° C./min and the melting peak temperature (Tm) is obtained. When more than one peak temperature is present, Tm-1, Tm-2, etc. are reported, starting at the high temperature side.

Flex life: A 0.2 mm thick film is compression molded from the fluoropolymer composition, and a specimen 110 mm×15 mm is cut from it. The flex life of the specimen is measured by the MIT method under a 1 kg load. The method is described in ASTM D 2156. A Toyoseiki K. K. MIT Folding Endurance Machine is used. The number of bending cycles until the test specimen breaks is the flex life (folding endurance).

Nitrogen gas permeability: The gas permeability measuring apparatus made by Shibata Chemical Machinery Co. is used to carry out measurements at 230° C. on an approximately 0.3 mm thick films prepared by compression molding at 350° C. Nitrogen permeability is commonly used for evaluating membranes for gas permeability (U.S. Pat. No. 5,688,307), and past experience has shown reasonable correlation between nitrogen, and for example, hydrogen chloride permeability of fluoropolymer membranes.

Examples 1 to 4, Comparative Examples 1 to 3

PTFE [A], trade named TLP, is made by Mitsui-DuPont Fluorochemical Co., of Japan, prepared by radiolysis of high molecular weigh PTFE: Tm: 328° C., Tc: 315° C., Hc: 59 J/g, MFR: 0.4 g/10 min. PTFE [B] is trade named Teflon® MP 1600, made by DuPont, Wilmington Del. USA by direct polymerization of TFE: Tm: 328° C., Tc: 311° C., Hc: 68 J/g, MFR: 19.0 g/10 min. Using a Plastomill (RH 60 type) made by Toyo Seiki, PTFE is melt-blended at 360° C. for 10 min with PFA [α] containing 6.6 wt % of PEVE and having an MFR of 1.9 g/10 min in the proportions shown in Tables 1 and 2. The properties of each composition are summarized in the tables.

Table 1 shows the effect of PTFE [A] at 10 and 20 wt % levels, and of 20 wt % each of PTFE [A] and PTFE [B]. Gas permeability decreases with increasing PTFE. Flex life is improved at 10 and 20 wt % PTFE, but decreases significantly at 40 wt % loading.

TABLE 1

|  | Comp. Ex. 1 | Example 1 | Example 2 | Comp. Ex. 2 |
|---|---|---|---|---|
| PTFE | — | A | A | A + B |
| Amount of PTFE wt % | 0 | 10 | 20 | 20 + 20 |
| PFA | α | α | α | α |
| Comonomer | PEVE | PEVE | PEVE | PEVE |
| Wt % of PEVE in PFA | 6.6 | 6.6 | 6.6 | 6.6 |
| MFR g/10 min | 1.9 | 1.6 | 1.0 | 1.5 |
| Melt peak temp. ° C. |  |  |  |  |
| Tm-1 | 286 | 318 | 321 | 325 |
| Tm-2 |  | 278 | 278 | 279 |
| Tm-3 |  |  |  |  |
| Flex life × 10$^4$ cycles | 310 | 660 | 420 | 9 |
| Nitrogen permeability cc$^3$(STP)·cm/ cm$^2$·sec·cm (Hg) | 1.13 | 0.85 | 0.79 | 0.52 |

Table 2 shows the effect of PTFE [B] on the same PFA used in Table 1. Gas permeability decreases with increasing PTFE loading. The flex life increases at loadings of 10 and 20 wt %, though not to the degree found with PTFE [A], and decreases significantly at 40 wt % loading.

TABLE 2

|  | Example 3 | Example 4 | Comp. Ex. 3 |
|---|---|---|---|
| PTFE | B | B | B |
| Amount of PTFE wt % | 10 | 20 | 40 |
| PFA | α | α | α |
| Comonomer | PEVE | PEVE | PEVE |
| Wt % of PEVE in PFA | 6.6 | 6.6 | 6.6 |
| MFR g/10 min | 2.3 | 2.9 | 4.0 |
| Melt peak temp. ° C. | | | |
| Tm-1 | 317 | 323 | 326 |
| Tm-2 | 307 | 313 | 318 |
| Tm-3 | 277 | 277 | 276 |
| Flex life × $10^4$ cycles | 370 | 340 | 20 |
| Nitrogen permeability $cc^3(STP) \cdot cm/ cm^2 \cdot sec \cdot cm (Hg)$ | 0.89 | 0.73 | 0.59 |

Examples 5 to 7, Comparative Examples 4 to 6

Each of copolymer [β] containing 5.1 wt % of PEVE and having an MFR of 1.8 g/10 min, copolymer [γ] containing 4.2 wt % of PEVE and having an MFR of 1.6 g/10 min, and copolymer [δ] containing 5.2 wt % of PPVE and having an MFR of 1.9 g/10 min are melt-blended with PTFE [A] in the proportions as shown in Table 3 using the method of Example 1. Properties of the compositions obtained are summarized in Table 3. It is seen that 10 wt % loadings of PTFE [A] with two PFA polymers made with PEVE, and a PFA made with PPVE, in all cases improve gas impermeability and flex life.

TABLE 3

|  | Comp. Ex. 4 | Ex. 5 | Comp. Ex. 5 | Ex. 6 | Comp. Ex. 6 | Comp. Ex. 7 |
|---|---|---|---|---|---|---|
| PTFE | — | A | — | A | — | A |
| Amount of PTFE wt % | 0 | 10 | 0 | 10 | 0 | 10 |
| PFA | β | β | γ | γ | δ | δ |
| Comonomer | PEVE | PEVE | PEVE | PEVE | PPVE | PPVE |
| Wt % of PEVE or PPVE in PFA | 5.1 | 5.1 | 4.2 | 4.2 | 5.2 | 5.2 |
| MFR g/10 min | 1.8 | 1.2 | 1.6 | 1.0 | 1.9 | 1.5 |
| Melt peak temp. ° C. | | | | | | |
| Tm-1 | 309 | 317 | 311 | 318 | 309 | 318 |
| Tm-2 | 299 | 286 | 303 | 292 | 285 | 287 |
| Tm-3 | | | | | | |
| Flex life × $10^4$ cycles | 250 | 590 | 190 | 270 | 100 | 220 |
| Nitrogen permeability $cc^3(STP) \cdot cm/cm^2 \cdot sec \cdot cm (Hg)$ | 0.97 | 0.75 | 1.11 | 0.73 | 0.96 | 0.73 |

Comparative Examples 7 to 10

Copolymer [ε] containing 3.3 wt % of PPVE and having an MFR of 1.8 g/10 min is melt-blended with PTFE [A] or PTFE [B] in the proportions shown in Table 4 using the method Example 1. Properties of the compositions obtained are summarized in Table 4. These comparative examples show that with PFA with comonomer content below that taught herein flex life decreases even at 10 wt % loading of PTFE.

TABLE 4

|  | Comp. Ex. 7 | Comp. Ex. 8 | Comp. Ex. 9 | Comp. Ex. 10 |
|---|---|---|---|---|
| PTFE | — | A | A | A |
| Amount of PTFE wt % | 0 | 10 | 20 | 10 |
| PFA | ε | ε | ε | ε |
| Comonomer | PPVE | PPVE | PPVE | PPVE |
| Wt % of PEVE in PFA | 3.3 | 3.3 | 3.3 | 3.3 |
| MFR g/10 min | 1.8 | 1.2 | 1.0 | 2.3 |
| Melt peak temp. ° C. | | | | |
| Tm-1 | 309 | 316 | 326 | 313 |
| Tm-2 | | 298 | 298 | 294 |
| Tm-3 | | | | |
| Flex life × $10^4$ cycles | 80 | 68 | 45 | 40 |
| Nitrogen permeability $cc^3(STP) \cdot cm/ cm^2 \cdot sec \cdot cm (Hg)$ | 0.99 | 0.82 | 0.74 | 0.90 |

Comparative Examples 11 to 15

Copolymer containing 6.7 wt % of PEVE and having an MFR of 14.3 g/10 min and copolymer [η] containing 6.7 wt % of PEVE and having an MFR of 5.4 g/10 min are melt-blended with PTFE [A] or PTFE [B] in the proportions shown in Table 5 in the same way as Example 1. Properties of the compositions obtained are summarized in Table 5. The PFA copolymers of these comparative examples have MFRs greater than the 4 g/10 min taught herein. In all cases it is seen that addition of even 10 wt % PTFE results in a decrease in flex life.

TABLE 5

|  | Comp. Ex. 11 | Comp. Ex. 12 | Comp. Ex. 13 | Comp. Ex. 14 | Comp. Ex. 15 |
|---|---|---|---|---|---|
| PTFE | — | A | B | — | A |
| Amount of PTFE wt % | 0 | 10 | 10 | 0 | 10 |
| PFA | ξ | ξ | ξ | η | η |
| Comonomer | PEVE | PEVE | PEVE | PEVE | PEVE |
| Wt % of PEVE in PFA | 6.7 | 6.7 | 6.7 | 6.7 | 6.7 |
| MFR g/10 min | 14.3 | 10.3 | 15.1 | 5.4 | 3.7 |
| Melt peak temp. ° C. | | | | | |
| Tm-1 | 310 | 321 | 318 | 309 | 321 |
| Tm-2 | 288 | 280 | 308 | 279 | 278 |

TABLE 5-continued

|  | Comp. Ex. 11 | Comp. Ex. 12 | Comp. Ex. 13 | Comp. Ex. 14 | Comp. Ex. 15 |
|---|---|---|---|---|---|
| Tm-3 |  |  | 278 |  |  |
| Flex life × $10^4$ cycles | 22 | 10 | 17 | 140 | 80 |
| Nitrogen permeability $cc^3(STP) \cdot cm/cm^2 \cdot sec \cdot cm\ (Hg)$ | 0.96 | 0.67 | 0.77 | 0.96 | 0.74 |

What is claimed is:

1. A melt-fabrication composition consisting essentially of a copolymer of tetrafluoroethylene and perfluoro(alkyl vinyl ether) (PFA) and about 5 to about 30 wt % of low molecular weight polytetrafluoroethylene (PTFE), based on the combined weight of the PFA and PTFE, wherein the low molecular weight PTFE is characterized by a heat of crystallization of at least about 50 J/g and wherein the perfluoro (alkyl vinyl ether) content of the PFA is at least about 4 wt %, based on the total weight of the copolymer, and the PFA has a melt flow rate (MFR) of no more than about 4 g/10 min.

2. The composition of claim 1 wherein said perfluoro (alkyl vinyl ether) is perfluoro(ethyl vinyl ether).

3. The composition of claim 1 wherein said perfluoro (alkyl vinyl ether) is perfluoro(propyl vinyl ether).

4. The composition of claim 1 wherein the perfluoro(alkyl vinyl ether) content of the PFA is no more than 20 wt %.

5. The composition of claim 1 as a melt blend.

6. The composition of claim 5 wherein said melt blend has an increased flex life and reduced gas permeability as compared to said PFA alone.

7. An article for handling liquid consisting essentially of a copolymer of tetrafluoroethylene and perfluoro(alkyl vinyl ether) (PFA) and about 5 to about 30 wt % of low molecular weight polytetrafluoroethylene (PTFE), based on the combined weight of the PFA and PTFE, wherein the low molecular weight PTFE is characterized by a heat of crystallization of at least about 50 J/g and wherein the perfluoro (alkyl vinyl ether) content of the PFA is at least about 4 wt %, based on the total weight of the copolymer, and the PFA has a melt flow rate (MFR) of no more than about 4 g/10 min.

8. The article of claim 7 wherein said article is a vessel.

9. The article of claim 7 wherein said article is a tube.

* * * * *